Patented Mar. 24, 1953

2,632,740

UNITED STATES PATENT OFFICE 2,632,740

THREE-PHASE EMULSION OF ARTIFICIAL RESINS

Luzius Schibler, Basel, Switzerland, assignor to Ciba Limited, a Swiss firm

No Drawing. Application December 21, 1948, Serial No. 66,582. In Switzerland December 24, 1947

4 Claims. (Cl. 260—6)

This invention is concerned with the manufacture of new three-phase emulsions of artificial resins, especially suitable for improving textiles. It comprises the emulsions themselves and the process of their manufacture, as well as their use in the wood, paper, leather and textile industries.

In co-pending U. S. patent application Ser. No. 783,844, now Patent No. 2,586,098, filed November 3, 1947, is described a process for making stable aqueous emulsions of artificial resins, wherein a solution in an organic solvent, which is substantially immiscible in water, of a hardenable condensate of formaldehyde with a substance of amide character capable of forming a hardenable aminoplast with formaldehyde, such as urea, thiourea, guanidine, biuret, dicyandiamide, melamine or the like, or a mixture of at least two of of these compounds, and with an alcohol which is substantially immiscible with water, is emulsified in an aqueous solution containing at least one protein and also at least one hydrotropic carbamide, such as urea or thiourea or a mixture thereof, capable of forming a hardenable aminoplast with formaldehyde.

The hardenable condensate is made in known manner by the simultaneous condensation of the aforesaid components with formaldehyde, or by forming a methylol compound of the substance of amide character and etherifying the methylol compound with the alcohol. In both cases the alcohol not consumed in the etherification may serve as a solvent for the condensate, so that solutions ready for use are obtained directly. Instead of or in addition to an excess of the alcohol, another solvent may be used to dissolve the condensate.

Urea and thiourea or mixtures of urea and thiourea are, in the sense of the aforesaid patent application and in the sense of the present invention, suitable hydrotropic carbamides which form hardenable aminoplasts with formaldehyde. According to Neuberg (Biochemische Zeitschrift, vol. 76 (1916), page 107), those readily soluble compounds of predominantly neutral reaction, which have the peculiar capacity of bringing substances, which per se are insoluble, into solution in water, may be termed "hydrotropic." As is known, low molecular carbamides, such for instance as urea, thiourea and monomethyl-urea, possess the property of being "hydrotropic," but this is not true of the higher molecular ureas, such for example as diphenyl-urea and its sulfonic acids.

In the aforesaid patent application the aqueous phase of the emulsion may also contain at least one further substance, such as biuret, dicyandiamide or the like, capable of forming a hardenable aminoplast with formaldehyde, and, when necessary, a basic substance or a buffer substance.

As alcohols substantially immiscible with water there are recommended those such as butyl alcohol, amyl alcohol, hexyl alcohol, cyclohexanol, benzyl alcohol or the like, and as solvents substantially immiscible with water, extraction benzine, lacquer benzine, sangajol, xylene, chlorobenzene, tetralin or the like, but advantageously an alcohol of the aforesaid kind. The expression "substantially immiscible with water" means that the alcohol or the solvent is immiscible or limitedly miscible with water.

Among proteins there are mentioned acid casein, advantageously purified acid casein free from lactalbumen, obtained, for example, as described in U. S. Patent No. 2,372,986. Besides casein there may be used other soluble protein bodies, for example, gelatine or fish glue. The protein is dissolved in water together with the hydrotropic carbamide and, in the case of certain proteins such as casein or the like, generally with the addition of a basic substance such, for example, as sodium hydroxide, potassium hydroxide, ammonia, sodium carbonate, borax, trisodium phosphate, triethanolamine, cyclohexylamine, morpholine or the like.

In all cases the protein solution forms the external aqueous phase of the emulsion, while the solution of the hardenable resin in the solvent wholly or partially immiscible with water constitutes the internal oily phase. The formation of the emulsion is usually carried out by gradually introducing the oily phase into the aqueous phase while the latter is thoroughly agitated.

As stated in U. S. Patent No. 2,586,098, filed November 3, 1947, the stable emulsions of artificial resins can be used for various purposes, for example, as binding agents, adhesives, dressing agents or impregnating agents, in the wood, paper, leather and textile industries, that is to say, whenever it is desired to produce in a simple manner by means of a stable preparation an adhesive or binding effect which is resistant to water, and, if desired, also fast to washing.

For improving textile fabrics the emulsions described above may be used in the thickly viscous form, in which they are usually obtained in their manufacture, or after dilution with water. In the former case there are produced, after hardening, durable stiffening or coating and bonding effects, while the diluted emulsions yield impregnation or matt effects which are fast to washing. The feel of the fabric after treatment by the present process is primarily determined by the quantity of dry substance per unit of surface, which may be relatively high when paste-like preparations are used, but may be almost imperceptible in the case of treatment with diluted baths. On the other hand, the uniformity of the coating or impregnation effect produced is often of decisive importance.

It is known that pigment suspensions, which are applied on the foulard as dye liquors, are inclined to lead easily to so-called "migrating" which may cause objectionable spots, streaks, etc. after drying. Attempts have been made to reduce or avoid this defect by the addition of small quantities of thickening agents such, for example, as tragacanth, to the foulard liquor. Printing colors which are to be used for machine printing or screen printing must have a considerably higher viscosity than foulard liquors, and therefore require a larger addition of thickening agent.

The artificial resin emulsions described above fulfil to a very great extent the viscosity requirements of pigment dyeing and printing preparations, but printing pastes prepared therewith are suitable for textile printing only in exceptional cases, because they have too high a content of dry substance. The prints produced therewith generally impart a rough and stiff feel to the textile fabric after hardening of the artificial resin. If the content of dry substance in the emulsion is lowered to a degree which is no longer harmful by the addition of water, there is obtained a thinly liquid preparation which, without the addition of further thickening agent, can hardly be used for dyeing on a foulard and still less for printing. Accordingly, the problem remains of thickening aqueous thinly liquid preparations without also increasing their content of dry substance.

It is known from U. S. Patent No. 2,361,277 that a thickening effect can be achieved with the emulsions of the oil-in-water type described therein, which contain the artificial resin in the aqueous phase, by incorporating in said single aqueous phase by emulsification an organic solvent which is immiscible with water. In contradistinction to increasing the viscosity of aqueous liquids by dissolving colloidal substances therein, such as tragacanth, starch, methyl-cellulose, polyvinyl alcohol or the like, the methods of the aforesaid patent, which may be called "emulsion-thickening," enables preparations to be obtained which are very suitable for the improving processes referred to above, and of which the content of dry substance can, if desired, be brought to a few parts per cent. so that unfavorable effects on fabrics due to adhesion, hardening etc., are avoided.

The present invention is based on the observation that this emulsion-thickening principle is also of advantage in connection with the emulsions of the aforesaid U. S. Patent No. 2,586,098, filed November 3, 1947, which are of the oil-in-water type and of which the artificial resin is present in the oily phase.

Accordingly, the present invention provides a process for making new three-phase emulsions of artificial resins, more especially suitable for improving textiles, from a two-phase emulsion of which the external aqueous phase consists of a solution containing at least one protein and at least one hydrotropic carbamide capable of forming a hardenable aminoplast with formaldehyde, and of which the internal oily phase consists of a solution in a substantially water-immiscible organic solvent of a water-insoluble hardenable condensate of formaldehyde with a substance of amide character capable of forming with formaldehyde a hardenable aminoplast and with an alcohol which is substantially immiscible with water, wherein there is incorporated in the emulsion as a second internal oily phase an inert water-immiscible organic solvent having a boiling point which is not appreciably below 100° C. and not appreciably above 200° C.

It is surprising that in the emulsification of an organic solvent in the aforesaid preparations, which are usually previously diluted with water, the primary artificial resin emulsion is not disturbed, so that homogeneous and very stable systems are obtained. The emulsifying and dispersing properties of the aqueous phase appear to suffice for stabilising the resin-emulsion and the solvent-emulsion. This applies not only in the case where the additional solvent to be emulsified is miscible with the primarily emulsified artificial resin or the solution thereof. The same effect is obtained when a solvent is used which would cause turbidity due to the flocculation of the resin if it were added to the artificial resin solution. The use of solvents which are immiscible or at most miscible to a limited extent with the primarily emulsified artificial resin or its solution constitutes an advantageous form of the process. It must therefore be assumed that the two oily phases, namely the carbamide resin dissolved preferably in an excess of the etherifying agent and the organic solvent which is usually emulsified subsequently, form disperse systems which are substantially independent of one another. Consequently, there are obtained 3-phase emulsions, in which the aqueous solution of the protein containing a hydrotropic carbamide forms the external phase, the artificial resin dissolved in an organic solvent forms the first internal phase, and a water-immiscible solvent, which is usually such as evaporates without leaving any residue, forms the second internal phase.

In order to produce these new preparations which are especially suitable for the application of pigments as referred to above the procedure will generally be first to dilute a carbamide resin emulsion of the kind hereinbefore referred to with water until there is obtained a preparation which after emulsifying therein a certain quantity of an inert water-immiscible organic solvent has the consistency and content of dry substance required for the application in question.

There have been found especially suitable for incorporation in the emulsions as solvents those of a benzine character consisting predominantly of hydrocarbons of the aliphatic series, for example, so-called extraction benzine or heavy benzine, lacquer benzine, sangajol or the like, which generally have no solvent action on carbamide resins of the urea series. It will be understood, of course, that other solvents or mixtures of solvents may be used for example, benzene, chlorobenzene, toluene, xylene, solvent naphtha, tetralin, dipentene, turpentine, trichlorethylene or the like, substances of the aromatic series, being however, less favorable from the point of view of hygiene and economy. In principle, however, any desired water-immiscible solvent may be used, provided that it is inert towards the other constituents of the emulsion, that is to say, it undergoes no chemical reaction therewith. Furthermore, there are preferred those solvents of which the boiling points are not appreciably below 100° C. and not appreciably above 200° C., and which are therefore neither too easily volatile nor too sparingly volatile.

The emulsification of the solvent may be brought about by means of the usual emulsifying apparatus or stirring devices. As a rule, the carbamide resin emulsion is previously diluted with water and the solvent forming the second disperse phase is added gradually, or if desired all at once. Depending on the relative proportions of the three phases there are obtained salve-like, thickly or thinly viscous preparations which have remarkable stability and keeping qualities.

While it is of advantage to use as the second disperse phase one which evaporates without leaving any residue, there may be added to the aqueous protein solution serving as the external phase various further substances which render the preparation suitable for improving fibrous materials. There come principally into consideration as such substances colored or non-colored pigments, matting agents, emulsifying agents, anti-foaming agents, water-repelling agents, softening agents, hardening agents and the like. If desired, there may be incorporated in the new products other water-soluble or oil-soluble binding agents, artificial resins or polymerisates in dissolved or emulsified form, without substantially disturbing the original emulsion system.

The following examples illustrate the invention, the parts being by weight unless otherwise stated and the relationship of parts by weight to parts by volume being the same as that of the kilogram to the liter.

*Example 1*

10 parts of titanium white are finely dispersed in 50 parts of a solution consisting of 10 parts of acid casein, 1 part of borax and 39 parts of water by triturating in a disc mill. 8 parts of thiourea are added to the resulting pigment paste and there are emulsified therein 40 parts of a resin solution consisting of 36 per cent. of a urea-thiourea formaldehyde cyclohexanol condensate and 64 per cent. of cyclohexanol. The resin emulsion is homogenised in a suitable apparatus, then mixed with 292 parts of water, and 600 parts of lacquer benzene (boiling at 150–200° C.) are emulsified in the diluted resin emulsion to form the second disperse phase. Although the resin as such is almost completely insoluble in lacquer benzine, there is obtained a smooth homogeneous liquor of low viscosity and good keeping qualities.

A lustrous viscose fabric is treated with the above liquor, on a foulard and, after being dried, is heated for ½ hour longer at 130° C., whereby a matt effect is obtained which is fast to washing and only slightly stiffens the fabric.

*Example 2*

5 parts of an iron oxide pigment are added to 20 parts of water in which have been dissolved 10 parts of gelatine, 8 parts of urea and 2 parts of thiourea, and the mixture is triturated in a roller mill to form a fine paste. 34 parts of a solution of 60 per cent. strength of a urea-formaldehyde-butanol resin in butanol are emulsified in the paste, and the resulting emulsion is mixed with 1 part of ammonium formate and 334 parts of water, whereby a thinly fluid suspension is obtained. The latter is then thickened by the gradual introduction and continuous emulsification of 600 parts of xylene so as to obtain a thinly viscous paste.

A cotton fabric is impregnated completely uniformly on the foulard with the resulting paste. After drying the fabric, it is heated for 1 minute at 170° C. whereby the dressing and the coloring effect simultaneously produced are fixed very fast to washing and rubbing. The relatively low content of dry substance in the preparation used ensures that the fabric is not substantially stiffened.

*Example 3*

43.5 parts of acid casein, 29.25 parts of urea and 2.25 parts of ammonium carbonate are dissolved in 75 parts of water. There are emulsified in the resulting viscous solution by means of a suitable apparatus 60 parts of a condensate of urea, formaldehyde and butanol, which is dissolved in 40 parts of butanol. The resulting thick transparent salve is diluted with 220 parts of water, and there are added 150 parts of an aqueous pigment suspension which contains, in addition to 37.5 parts of an extremely finely divided reaction product of diazotised 2:5-dichloraniline with 2:3-hydroxynaphthoic acid-2''-anisidide, 12 parts of acid casein, 1.5 parts of borax and 5 parts of highly sulfonated castor oil. After 10 parts of ethylene glycol and 20 parts of an aqueous solution of 50 per cent. strength of ammonium thiocyanate have been added, there are emulsified in the diluted and pigmented resin emulsion 350 parts of benzine boiling at 100–140° C., in which the primarily emulsified resin is practically insoluble.

There is obtained a smooth viscous printing color which is printed on a crepe fabric of cotton, viscose or staple fibers of regenerated cellulose. After drying and hardening, for example, for 5 minutes at 150° C. there are obtained bright prints which are fast to washing and rubbing and do not markedly stiffen the fabric.

*Example 4*

25 parts of gas-black are dispersed in a solution of 50 parts of acid casein, 3 parts of ammonia solution of 25 per cent. strength, 30 parts of urea and 10 parts of thiourea in 100 parts of water. 10 parts of glycerine are added to the pigment paste, and there are emulsified therein 56 parts of a melamine resin etherified with butanol and dissolved in 24 parts of butanol. The whole is then diluted with 232 parts of water, and the resulting thinly fluid suspension is then thickened to give it a consistency suitable for printing by emulsifying therein 460 parts of heavy benzine (boiling at 100–150° C.).

The resulting thickly viscous printing color has a content of dry substance amounting only to 17 per cent., and therefore does not substantially stiffen the fabric. When printed on cotton or cellulose acetate artificial silk and hardened for 2½ minutes at 160° C. black prints fast to washing are obtained.

*Example 5*

75 parts of the urea-formaldehyde-butanol resin dissolved in butanol, mentioned in Example 3, are emulsified in a solution containing 25 parts of casein, 2 parts of an aqueous solution of sodium hydroxide of 30 per cent. strength, 20 parts of urea, 113 parts of water, 4 parts of a highly sulphonated castor oil and 10 parts of finely dispersed Indanthrene Blue RS (Color Index No. 1106). The resin emulsion is then diluted with a solution of 5 parts of ammonium chloride in 96 parts of water, and 500 parts of chlorobenzene are dispersed in the aqueous phase to form the second oily phase. The preparation is treated in a homogeniser and then there are added 150 parts of a neutral emulsion of 30 per cent, strength obtained by polymerising a mixture of acrylic acid ethyl ester and acrylic acid butyl ester in aqueous solution.

The resulting paste is printed on linen or a nylon fabric. The material is dried for 10 minutes at 140° C. There are obtained pigment prints fast to rubbing and washing.

Example 6

56 parts of gelatine and 56 parts of urea are dissolved in 75 parts of water. The resulting solution is introduced into an apparatus provided with a very powerful stirring mechanism, and then 151 parts of the carbamide resin solution mentioned in Example 3 are run in. After the resulting emulsion has been homogenised, it is diluted with 112 parts of water, and there are then added 100 parts of a pigment preparation which contains 25 per cent. of the finely dispersed reaction product of diazotised 2-amino-5-chlorotoluene with 2:3-hydroxynaphthoic acid-4'-chloro-5'-methyl-anisidide, 8 per cent. of casein, 1 per cent of borax and 3 per cent. of sodium lauryl sulfate. 25 parts of an aqueous solution of 50 per cent, strength of ammonium thiocyanate are added to the thin resin emulsion containing pigment, and then 425 parts of lacquer benzine or sangajol (boiling at 150–210° C.) are added, and the whole is powerfully stirred until a smooth uniform paste is obtained which can easily be used for printing.

When the above paste is applied, for example, to cotton sateen, fixed for 5 minutes at 140° C. or fixed by acid steaming at 102° C., there are obtained bright fast red prints.

What I claim is:

1. A three-phase emulsion of artificial resins, especially suitable for improving textiles, of which the external phase is a pigment-containing aqueous phase and consists of a protein solution containing at least one hydrotropic carbamide of the group consisting of urea and thiourea, of which the first internal oily phase consists of a solution, in a substantially water-immiscible alcohol of a water-insoluble hardenable condensate of formaldehyde with at least one aminoplast-forming substance selected from the group consisting of urea, thiourea, guanidine, biuret, dicyandiamide and melamine and with a substantially water-immiscible alcohol, and of which the second internal oily phase consists of an inert organic water-immiscible solvent boiling not appreciably below 100° C. and not appreciably above 200° C. and which does not dissolve the water-insoluble condensate.

2. A three-phase emulsion of artificial resins, especially suitable for improving textiles, of which the external phase is a pigment-containing aqueous phase and consists of a protein solution containing at least one hydrotropic carbamide of the group consisting of urea and thiourea, of which the first internal oily phase consists of a solution, in a substantially water-immiscible alcohol, of a water-insoluble hardenable condensate of formaldehyde with at least one aminoplast-forming substance of the group consisting of urea, thiourea, guanidine, biuret, dicyandiamide and melamine and with a substantially water-immiscible alcohol, and of which the second internal oily phase consists of an inert organic water-immiscible solvent boiling not appreciably below 100° C. and not appreciably above 200° C. and predominantly consisting of a mixture of aliphatic hydrocarbons and which does not dissolve the water-insoluble condensate.

3. A three-phase emulsion of artificial resins, especially suitable for improving textiles, of which the external phase is a pigment-containing aqueous phase and consists of a protein solution containing at least one hydrotropic carbamide of the group consisting of urea and thiourea, of which the first internal oily phase consists of a solution, in a substantially water-immiscible alcohol, of a water-insoluble hardenable condensate of formaldehyde with at least one aminoplast-forming substance of the group consisting of urea, thiourea, guanidine, biuret, dicyandiamide and melamine and with a substantially water-immiscible alcohol, and of which the second internal oily phase consists of an inert organic water-immiscible solvent boiling not appreciably below 100° C. and not appreciably above 200° C. and which does not dissolve the water-insoluble condensate, in which emulsion the protein is acid casein.

4. A three-phase emulsion of artificial resins, especially suitable for improving textiles, of which the external phase is a pigment-containing aqueous phase and consists of a protein solution containing at least one hydrotropic carbamide of the group consisting of urea and thiourea, of which the first internal oily phase consists of a solution, in a substantially water-immiscible alcohol, of a water-insoluble hardenable condensate of formaldehyde with at least one aminoplast-forming substance of the group consisting of urea, thiourea, guanidine, biuret, dicyandiamide and melamine and with a substantially water-immiscible alcohol, and of which the second internal oily phase consists of an inert organic water-immiscible solvent boiling not appreciably below 100° C. and not appreciably above 200° C. and predominantly consisting of a mixture of aliphatic hydrocarbons and which does not dissolve the water-insoluble condensate, in which emulsion the protein is acid casein.

LUZIUS SCHIBLER.

REFERENCES CITED

The following references are of record in the file of this patent:

UNITED STATES PATENTS

| Number | Name | Date |
|---|---|---|
| 2,292,200 | Cassel | Aug. 4, 1942 |
| 2,310,795 | La Piana | Feb. 9, 1943 |
| 2,342,641 | Cassel | Feb. 29, 1944 |
| 2,356,794 | Peiker | Aug. 29, 1944 |
| 2,361,277 | Enderlin et al. | Oct. 24, 1944 |
| 2,364,692 | Cassel | Dec. 12, 1944 |
| 2,453,752 | La Piana | Nov. 16, 1948 |
| 2,586,098 | Schibler | Feb. 19, 1952 |

FOREIGN PATENTS

| Number | Country | Date |
|---|---|---|
| 561,641 | Great Britain | May 30, 1944 |

OTHER REFERENCES

National Paint, Varnish and Lacquer Assoc. Scientific Section, Circular 709, p. 466.

Neuberg, Biochemische Zeitschrift, vol. 76, 1916, page 107.